(12) United States Patent
Jang et al.

(10) Patent No.: US 7,777,934 B2
(45) Date of Patent: Aug. 17, 2010

(54) COLOR PIXEL STRUCTURE OF AN ELECTROCHROMIC DISPLAY

(75) Inventors: Jae Eun Jang, Seoul (KR); Seung Nam Cha, Seoul (KR); Jae Eun Jung, Seoul (KR); Chang Ho Noh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/157,343

(22) Filed: Jun. 11, 2008

(65) Prior Publication Data

US 2009/0161195 A1     Jun. 25, 2009

(30) Foreign Application Priority Data

Dec. 20, 2007 (KR) .................... 10-2007-0134106

(51) Int. Cl.
*G02B 26/00* (2006.01)
(52) U.S. Cl. .................. 359/265; 359/267; 359/272
(58) Field of Classification Search ............. 359/265, 359/263, 267, 272, 273, 275, 238
See application file for complete search history.

(56) References Cited

U.S. PATENT DOCUMENTS

| | | | |
|---|---|---|---|
| 2002/0158999 A1* | 10/2002 | Shima | 349/58 |
| 2005/0036077 A1* | 2/2005 | Khan et al. | 349/36 |
| 2005/0094059 A1* | 5/2005 | Noguchi | 349/106 |
| 2005/0213186 A1* | 9/2005 | Kokeguchi et al. | 359/265 |
| 2005/0270619 A1* | 12/2005 | Johnson et al. | 359/265 |
| 2006/0061530 A1* | 3/2006 | Yuasa | 345/88 |
| 2007/0206271 A1* | 9/2007 | Verschueren et al. | 359/296 |
| 2008/0137168 A1* | 6/2008 | Abe | 359/273 |

* cited by examiner

*Primary Examiner*—Timothy J Thompson
(74) *Attorney, Agent, or Firm*—Cantor Colburn LLP

(57) ABSTRACT

A color pixel structure of a color display system based on electrochromism. The color pixel structure includes two one-cell two-color type unit cells laminated. Each of the unit cells includes an upper panel, a lower panel and electrochromic materials of different colors applied to both the upper and lower panels. The color pixel structure exhibits improved color characteristics and have a simple structure. The color pixel structure can be applied to a variety of electrochromic displays due to their excellent visibility and simple structure.

17 Claims, 11 Drawing Sheets
(11 of 11 Drawing Sheet(s) Filed in Color)

White

Red

Green

Blue

Black

1010

COLOR PIXEL STRUCTURE OF AN ELECTROCHROMIC DISPLAY

This application claims priority to Korean Patent Application No. 10-2007-134106 filed on Dec. 20, 2007, and all of the benefits accruing therefrom under 35 U.S.C. §119, the contents of which in its entirety are herein incorporated by reference.

BACKGROUND OF THE INVENTION

1. Field of the Invention

The present invention relates to color pixel structures of color display systems based on electrochromism. More particularly, the color pixel structures includes one-cell two-color type unit cells, each having an upper panel, a lower panel and electrochromic materials of different colors applied to both the upper and lower panels, thereby achieving improved color characteristics and a simple structure.

2. Description of the Related Art

Electrochromism is when the color of a material reversibly changes depending on the direction of an electric field when a voltage is applied to the material. Electrochromic materials refer to materials that exhibit electrochromism and can undergo reversible changes in optical properties by electrochemical redox reactions. That is, some electrochromic materials do not have any color when no external electric field is applied and are then colored in the presence of an electric field. However, some electrochromic materials have particular colors when no external electric field is applied and then their colors disappear in the presence of an electric field. Such electrochromic materials include, for example, tungsten oxide and molybdenum oxide as inorganic compounds, and pyridine compounds and aminoquinone compounds as organic compounds, but are not limited to these compounds.

Conventional electrochromic devices utilizing the principle of electrochromism offer the advantages of high reflectance without the need for external light sources, flexibility, portability and lightweight. Based on these advantages, conventional electrochromic devices are expected to have many applications in a variety of flat panel displays. In particular, conventional electrochromic devices have received considerable attention in recent years for their applicability to electronic paper, which is currently being investigated as an electronic medium that is likely to replace traditional paper.

FIG. 1 is a schematic cross-sectional diagram illustrating a unit cell of a conventional electrochromic display device. As shown in FIG. 1, an upper transparent electrode 10 is coated with a transparent semiconductor material 20 and an electrochromic material 30, and a lower electrode 60 is coated with a counter material 50 responding to electrochemical reactions and a reflective material 40 reflecting light.

FIGS. 2a through 2e are conceptual diagrams illustrating a principle of color representation of a conventional color display device based on electrochromism. Like a conventional color display, an electrochromic display includes a structure in which three respective unit cells emitting red, green and blue colors are arranged parallel to one another.

To represent a white color in the conventional electrochromic display device, an electric field is removed from all color display units (see FIG. 2a). Since electrochromic materials of all color display units are transparent, white light entering all display units is reflected from reflective panels, so that an observer can perceive a white color.

An electric field is applied to a red display unit and no electric field is applied to the other color units (i.e. green and blue color units) to represent a red color. As a result, the red display unit reflects incoming red light to emit a red color, and the other color units produce a white color, thus allowing the observer to perceive a red color (see FIG. 2b). The same principle as above is applied when it is intended to represent green and blue colors (see FIGS. 2c and 2d). That is, an electric field is applied to a display unit corresponding to an intended color to display the color. As for a black color, an electric field is applied to all color units to allow the respective display units to produce red, green and blue colors. Since the amount of light reflected from the display units is smaller than that in the case of white representation, the observer perceives a black color (see FIG. 2e).

When the conventional unit cells arranged in parallel are used to represent colors other than white, however, light of undesired colors enters the eyes of the observer, resulting in deterioration of color purity. For example, the red emitting unit cell represents a red color, but the other adjacent two unit cells (green and blue emitting unit cells) produce a white color. As a result, the observer perceives a color close to pink but not a red color. In conclusion, a reduction in color purity in representing images, such as images printed on paper, in the parallel type structure is inevitable.

Such a problem can be solved by the provision of laminate type cell structures, for example, structures in which unit cells emitting cyan, magenta and yellow are vertically laminated (see FIG. 3). Since only colors produced from the laminates can be viewed by an observer, substantially pure colors can be represented. However, the laminates consist of the three unit cells, making the lamination procedure complex and the operation of the cells complicated. Further, a total of six electrodes (each layer including upper and lower electrodes) are laminated, disadvantageously causing a loss of light.

BRIEF SUMMARY OF THE INVENTION

The present invention has made an effort to solve the above-stated problems and aspects of the present invention provide a color pixel structure of an electrochromic display achieving improved color characteristics and a simple structure.

In an exemplary embodiment, the present invention provides a color pixel structure of an electrochromic display, including two one-cell two-color type unit cells. Each unit cell includes an upper panel, a lower panel and electrochromic materials of different colors applied to both the upper and lower panels, wherein the unit cells are laminated.

In another exemplary embodiment, the present invention provides a color pixel structure of an electrochromic display, including two one-cell two-color type unit cells. Each unit cell includes an upper panel, a lower panel and electrochromic materials of different colors applied to both the upper and lower panels, wherein the unit cells are arranged parallel to each other.

In another exemplary embodiment, one of the two unit cells is of a one-cell one-color type in which an electrochromic material is applied to either the upper or lower panel.

In another exemplary embodiment, the present invention provides a color pixel structure of an electrochromic display, including two one-cell two-color type unit cells. Each unit cell includes an upper panel, a lower panel and an electrochromic material applied to either the upper or lower panel, wherein the unit cells are arranged parallel to each other and a common unit cell is laminated thereon.

In another exemplary embodiment, the color pixel structure includes additional one-cell one-color type unit cells laminated on the respective unit cells arranged in parallel.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other aspects, features and advantages of the present invention will become apparent from the following detailed description when taken in conjunction with the accompanying drawings, in which.

DETAILED DESCRIPTION OF THE INVENTION

Figure 1:
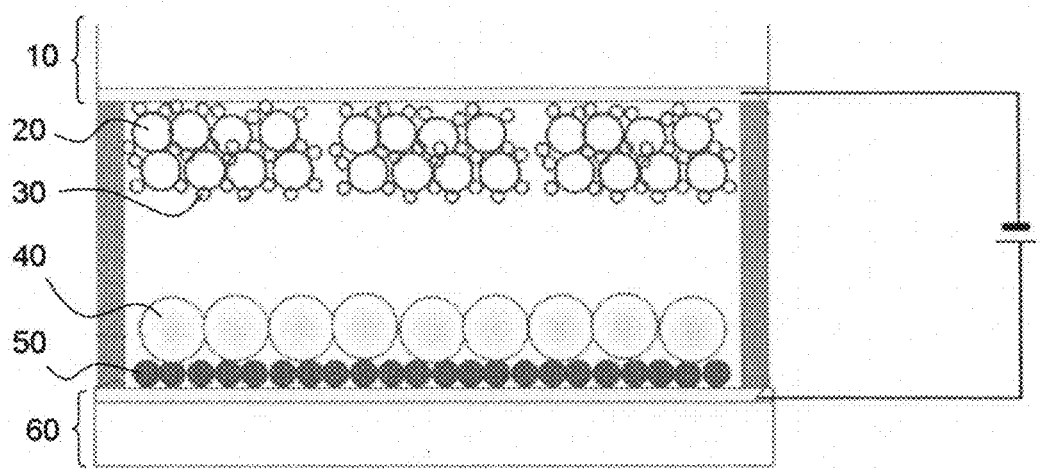
FIG. 1 is a schematic cross-sectional diagram illustrating a unit cell of a conventional electrochromic display device.
Figure 2A:
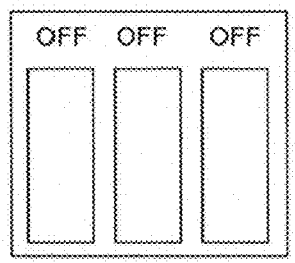
FIG. 2a through 2e are conceptual diagrams illustrating the principle of color representation of a conventional color pixel structure.
Figure 2B:
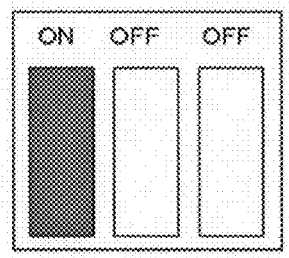
Figure 2C:
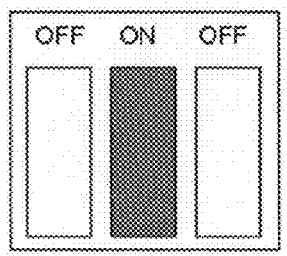
Figure 2D:
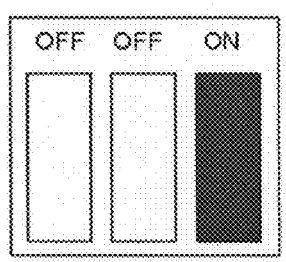
Figure 2E:
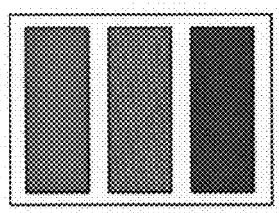
Figure 3:
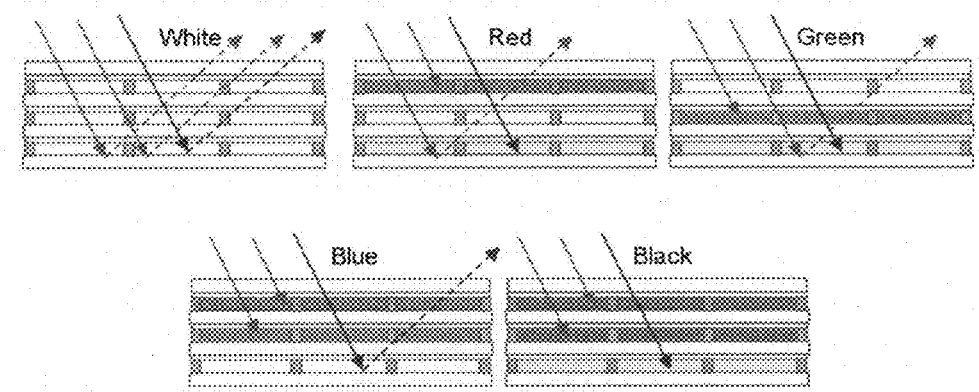
FIG. 3 shows conceptual diagrams illustrating the principle of color representation in conventional laminate type color pixel structures.

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Hereinafter, exemplary embodiments of the present invention will be described in detail with reference to the accompanying drawings.

According to one embodiment, there is provided a color pixel structure of an electrochromic display, comprising two one-cell two-color type unit cells, each of which includes an upper panel, a lower panel and electrochromic materials of different colors applied to both the upper and lower panels, wherein the unit cells are laminated or arranged parallel to each other.

Figure 4:
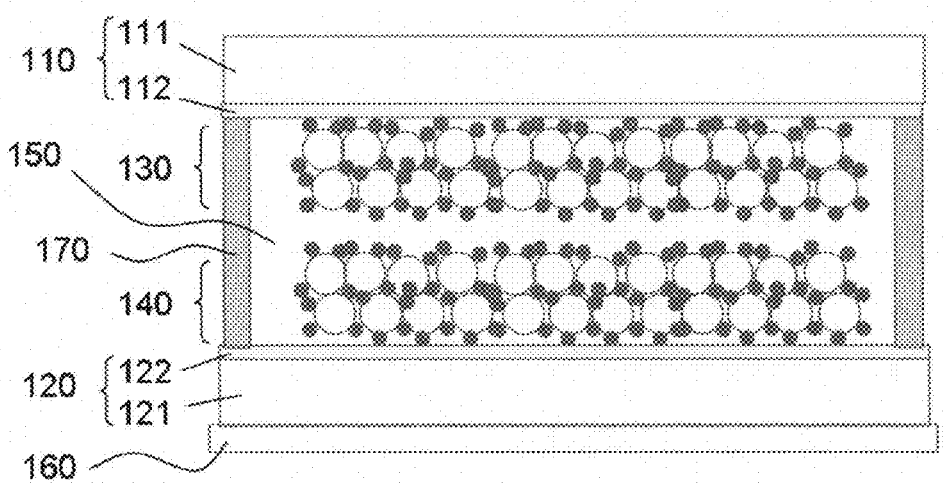
FIG. 4 is a schematic cross-sectional diagram of an exemplary embodiment of a one-cell two-color type unit cell according to the present invention.

FIG. 4 is a schematic cross-sectional diagram of an exemplary embodiment of one of the one-cell two-color type unit cells according to the present invention. Referring to FIG. 4, the unit cell includes an upper panel 110 including a transparent substrate 111 and a conductive layer 112 formed on the transparent substrate 111, a lower panel 120 disposed opposite to the upper panel 110 and including a transparent substrate 121 and a conductive layer 122 formed on the transparent substrate 121, an electrolyte 150 accommodated between the upper panel 110 and the lower panel 120, a first electrochromic material layer 130 formed on the conductive layer 112 of the upper panel 110, a second electrochromic material layer 140 formed on the conductive layer 122 of the upper panel 110, a reflective panel 160 positioned under the lower panel 120, and partitions 170 separating the unit cell from adjacent cells.

Electrochromic materials for the first and second electrochromic material layers 130 and 140 emit different colors. According to an exemplary embodiment, the electrochromic materials for the first and second electrochromic material layers 130 and 140 have the same electrochemical properties. For example, the materials are discolored upon oxidation or reduction. A counter material layer (not shown) may be formed on the lower panel 120.

Figure 5A:
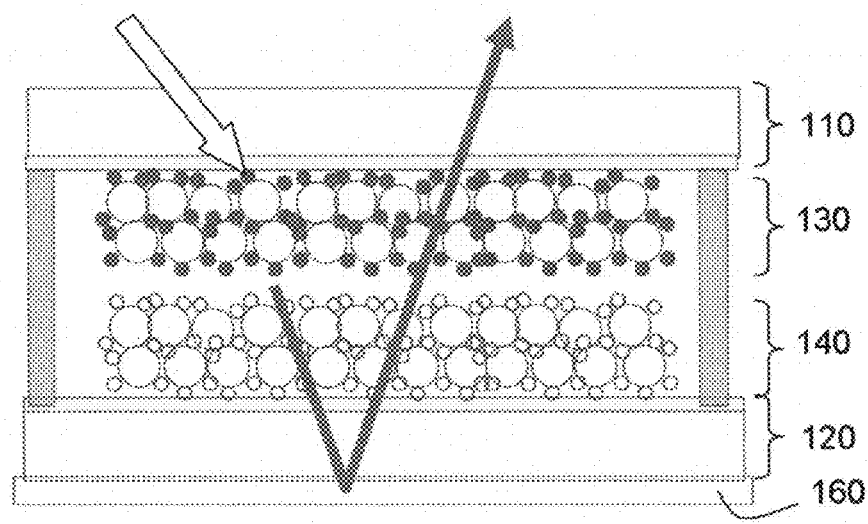
FIGS. 5a through 5c are conceptual diagrams illustrating an exemplary embodiment of the principle of color representation in a color pixel structure according to the present invention.
Figure 5B:
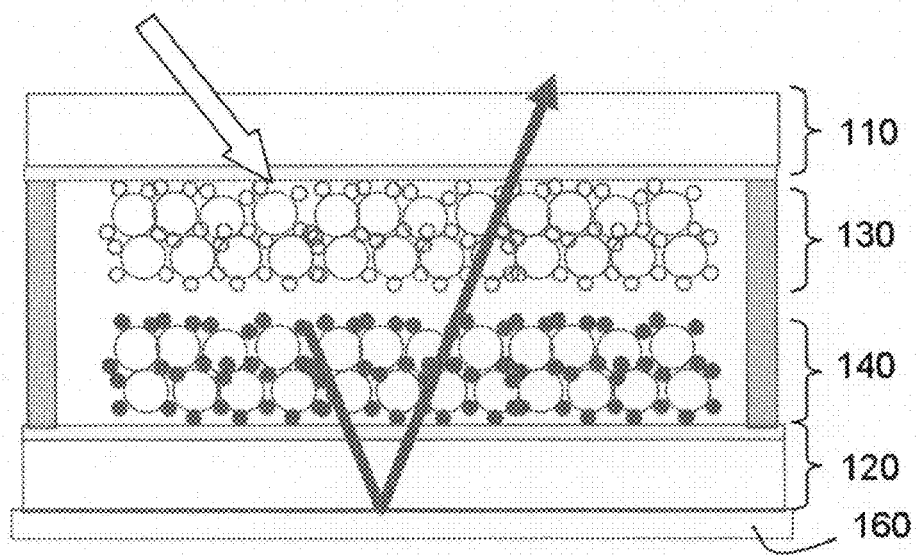
Figure 5C:
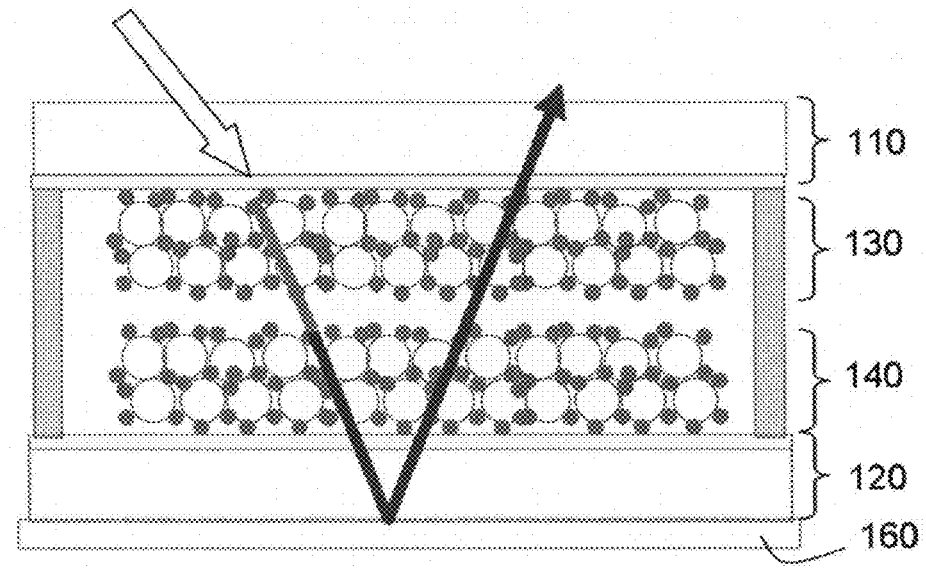

FIGS. 5a through 5c are exemplary conceptual diagrams illustrating an exemplary embodiment of the principle of color representation in the one-cell two-color unit cell according to the present invention.

Specifically, FIG. 5a shows a color representation of the one-cell two-color unit cell in which the first electrochromic material layer 130 formed on the upper panel 110 has a magenta color and the second electrochromic material layer 140 formed on the lower panel 120 has a cyan color. When an appropriate electric field is applied to the upper panel 110, an electrochromic material for the first electrochromic material layer 130 responds to the electric field to produce a magenta color. According to the current exemplary embodiment, only red and blue wavelengths of white light incident from an external source pass through the first electrochromic material layer 130 and the underlying second electrochromic material layer 140 producing no color and are reflected from the reflective panel 160 to enter the eyes of an observer, so that the observer perceives a magenta color.

As shown in FIG. 5b, according to an exemplary embodiment, when an electric field is applied to the lower panel 120, the second electrochromic material layer 140 of the lower panel 120 responds to the electric field to produce a cyan color from the lower panel 120. White light incident from an external source passes through the first electrochromic material layer 130 having no color. Then, light of red wavelengths is absorbed in the second electrochromic material layer 140, and light of green and blue wavelengths only passes through the second electrochromic material layer 140 and is reflected from the reflective panel 160 to enter the eyes of the observer, so that the observer perceives a cyan color.

As shown in FIG. 5c, according to an exemplary embodiment, when an electric field is applied to both the upper and lower panels 110 and 120, only red and blue wavelengths of white light incident from an external source pass through the first electrochromic material layer 130. Then, the red wavelengths of the incident light are absorbed in the second electrochromic material layer 140 and the blue wavelengths pass through the second electrochromic material layer 140, thus allowing the observer to perceive a blue color.

Therefore, according to an exemplary embodiment of the present invention, the unit cell can produce two colors and a mixed color thereof. Therefore, based on the characteristics of the unit cell, a color pixel structure of an electrochromic display with a simple structure and high color purity can be realized.

Figure 6:
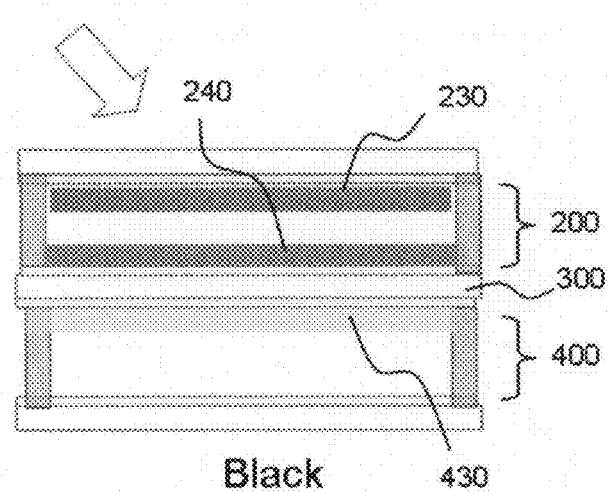
FIG. 6 is a schematic cross-sectional diagram of an exemplary embodiment of a laminate type color pixel structure according to the present invention.

FIG. 6 shows an exemplary embodiment of a lamination type color pixel structure according to the present invention. In the color pixel structure, two unit cells 200 and 400 having a one-cell two-color structure are vertically laminated, and an intermediate panel 300 is interposed therebetween.

White, black, red, green and blue colors can be perfectly realized from the color pixel structure due to the lamination of the unit cells 200 and 400, each of which emits two colors. The lamination of the two unit cells 200 and 400 can achieve reduced structural complexity and the number of electrodes laminated is decreased to four, which prevents a reduction in transmittance. The intermediate panel 300 of the pixel structure may be made of a different material from the upper and lower panels. For example, the intermediate panel 300 may be a simple insulating film. Two separate panels can be used instead of the intermediate panel 300.

In the current exemplary embodiment, the electrochromic materials are selected from cyan, magenta and yellow emitting electrochromic materials 240, 230 and 430. Alternatively, the electrochromic materials may be selected from the group including cyan, magenta, yellow, red, green and blue emitting electrochromic materials.

FIGS. 7a through 7e illustrate an exemplary embodiment of the principle of color representation of the laminate type color pixel structure according to the present invention.

Figure 7A:
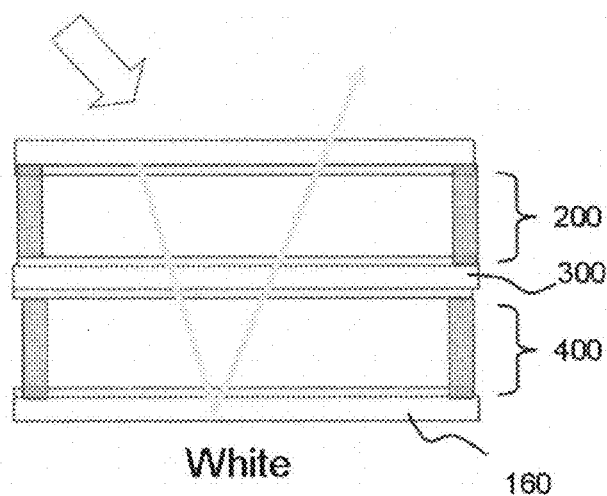
FIGS. 7a through 7e are diagrams illustrating an exemplary embodiment of the principle of color representation in laminate type color pixel structures according to the present invention.
Figure 7B:
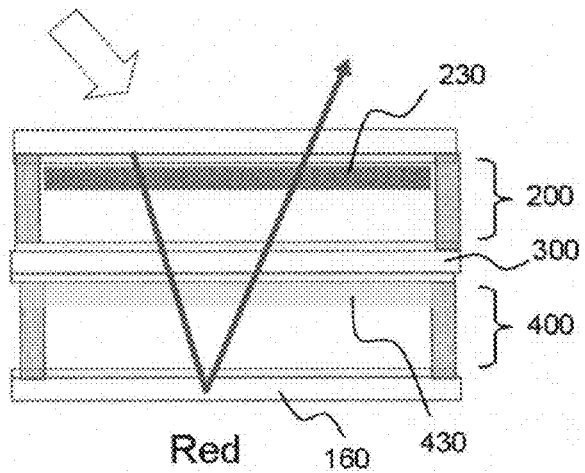

As shown in FIG. 7a, the electrochromic materials become transparent when no electric field is applied to the upper and lower unit cells 200 and 400 and the reflective panel 160 completely reflects incoming white light to produce a white color. As shown in FIG. 7b, when an appropriate electric field is applied to a magenta emitting electrochromic material 230 of the upper unit cell 200 and a yellow emitting electrochromic material layer 430 of the lower unit cell 400, light of green wavelengths of the incident white light is completely absorbed in the upper unit cell 200 and light of red and blue wavelengths only passes through the upper unit cell 200. Then, the light of blue wavelengths is completely absorbed in the lower unit cell 400, and only light of the red wavelengths passes through the lower unit cell 400 and is reflected from a reflective panel 160. Thus, an observer perceives a pure red color without any unnecessary interference of light.

Figure 7C:
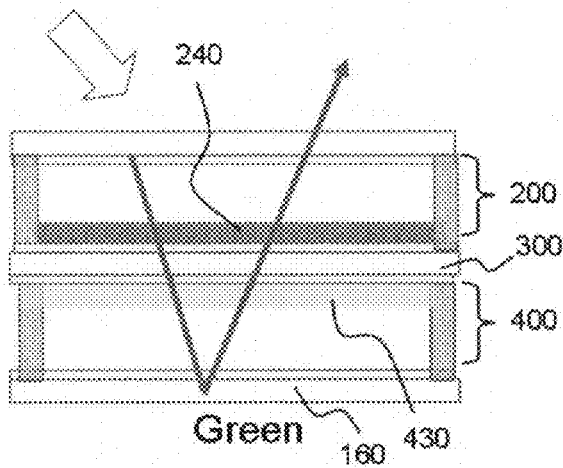
Figure 7D:
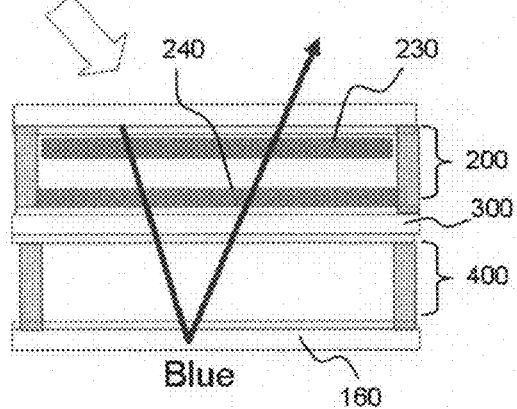

FIGS. 7c and 7d illustrate other color representation of the laminate type color pixel structure according to the present invention. Based on the same principles above, green and blue colors can be realized in the color pixel structure (FIGS. 7c and 7d).

Figure 7E:
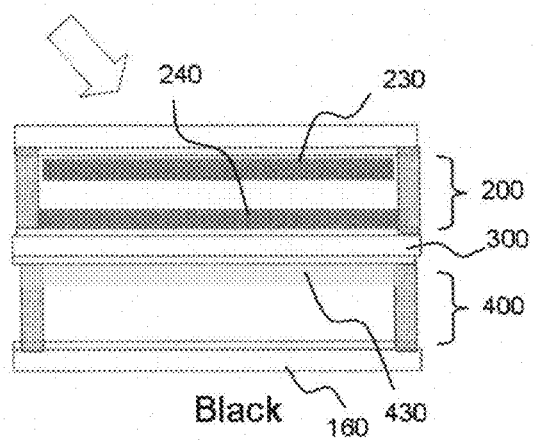

As shown in FIG. 7e, a black color can be perfectly realized in a mode where light is completely absorbed. The use of a black emitting electrochromic material in the pixel structure capable of producing four colors enables emission of all the colors. Even when a portion of the incident light penetrates the black emitting electrochromic material due to a slight different in absorption or emission wavelength, it is re-absorbed in the black part, resulting in an increase in contrast. The reference numerals shown in FIGS. 7c, 7d and 7e are the same as those shown in FIGS. 7a and 7b, therefore a detailed description thereof has been omitted.

In an exemplary embodiment the present invention, one of the two unit cells laminated in the color pixel structure may be of a one-cell one-color type to emit only one color.

In an embodiment, the two one-cell two-color unit cells may be arranged parallel to each other in the color pixel structure.

Figure 8A:
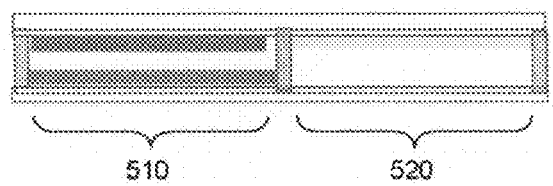
FIGS. 8a through 8c are schematic cross-sectional diagrams of an exemplary embodiment of parallel type color pixels according to the present invention.

FIG. 8a is an exemplary schematic cross-sectional diagram of the parallel type color pixel structure. The parallel type color pixel structure cannot realize perfect pure colors but can reduce the generation of unwanted light to achieve improved visibility. That is, unwanted light is generated in two cells 510 and 520 of the three cells used in the conventional art pixel structure, resulting in deterioration of visibility, whereas the area of the cells 510 and 520 where unwanted light is generated in the parallel type color pixel structure can be reduced from ⅔ to ½, resulting in markedly improved color characteristics. Furthermore, from the standpoint of processing and structural simplicity, the parallel type pixel structure is advantageous over the conventional art pixel structure.

Figure 8B:
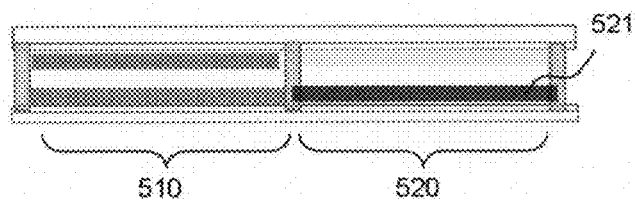
Figure 8C:
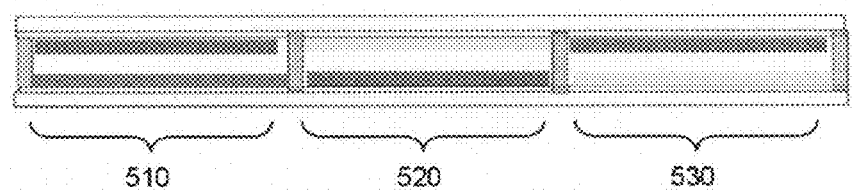

As shown in FIG. 8b, a black emitting electrochromic material is used to form one 521 of the four electrochromic layers in the parallel type color pixel structure, resulting in an increase in contrast. In an exemplary embodiment, one of the two unit cells 510 and 520 arranged in parallel may be of a one-cell one color type to emit only one color. As shown in FIG. 8c, the parallel type pixel structure may have a structure in which three one-cell two-color type unit cells 510, 520 and 530 are arranged in parallel. Even in this case, since each cell can produce two colors, the amount of unwanted light can be reduced, resulting in the improvement of visibility.

Figure 9A:
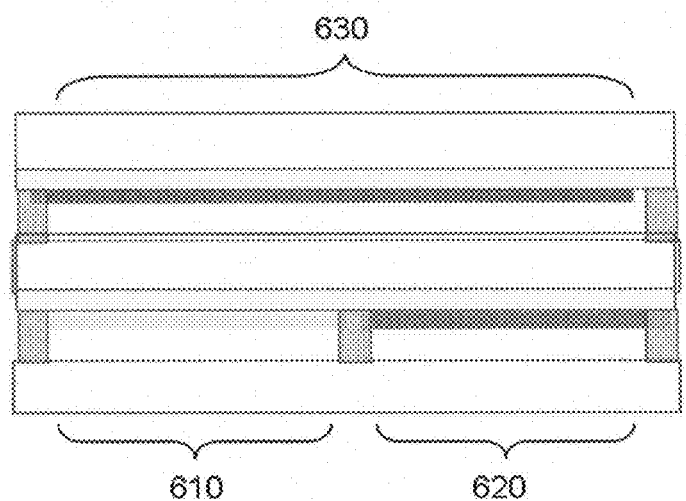
FIGS. 9a through 9c are schematic cross-sectional diagrams of an exemplary embodiment of pixel structures in which one-cell one-color type unit cells are laminated according to the present invention.
Figure 9B:
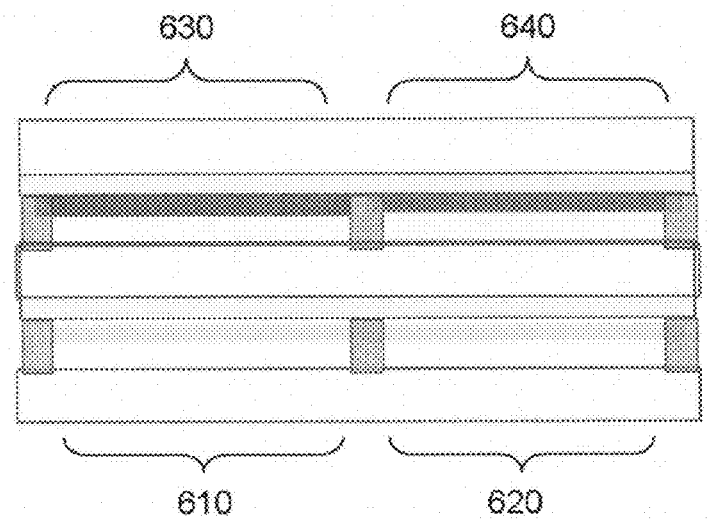
Figure 9C:
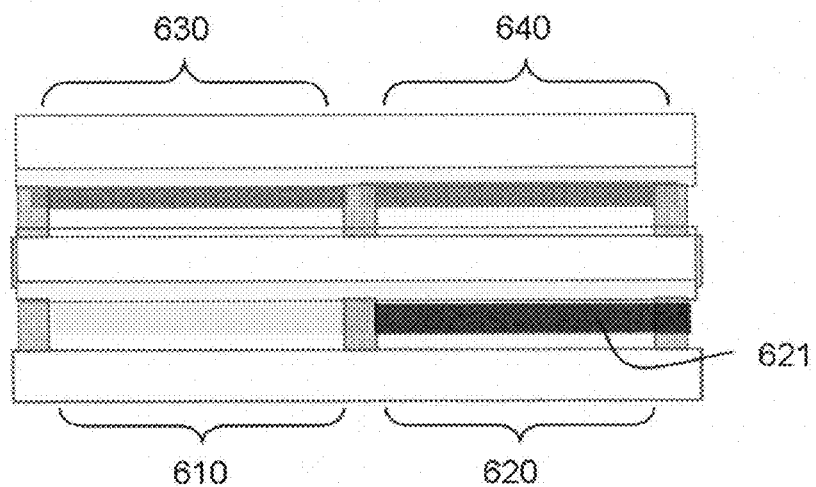

Another exemplary color pixel structure is shown in FIG. 9a. As shown, in the color pixel structure, two one-cell one-color type unit cells 610 and 620 are arranged parallel to each other and one common unit cell 630 is laminated thereon. FIG. 9b illustrates another color pixel structure in which two one-cell one-color type unit cells 610 and 620 are arranged parallel to each other and two one-cell one-color type unit cells 630 and 640 are laminated on the respective unit cells 610 and 620. As shown in FIG. 9c, the unit cell 620 can use a black emitting electrochromic material 621 to achieve improved contrast. The area of the cells where unwanted light is generated in the pixel structures can be reduced from ⅔ to ½, resulting in an improvement in color purity. In addition, the number of the cells for color representation is decreased from three to two to achieve a high resolution. Furthermore, from the standpoint of processing and structural simplicity, the pixel structures are advantageous over the prior art three-layer laminate structures.

Figure 10:
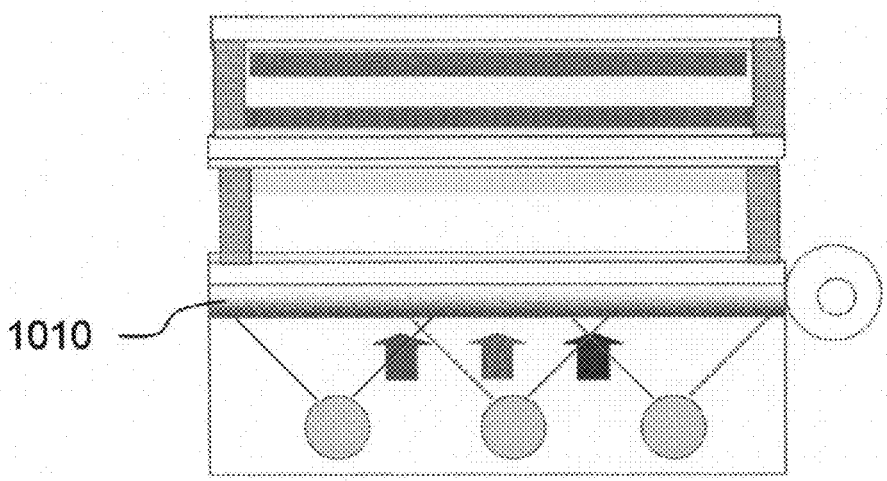
FIG. 10 is a schematic cross-sectional diagram of an exemplary embodiment of a combined transmissive/reflective (transflective) color pixel structure according to the present invention.
Figure 11:
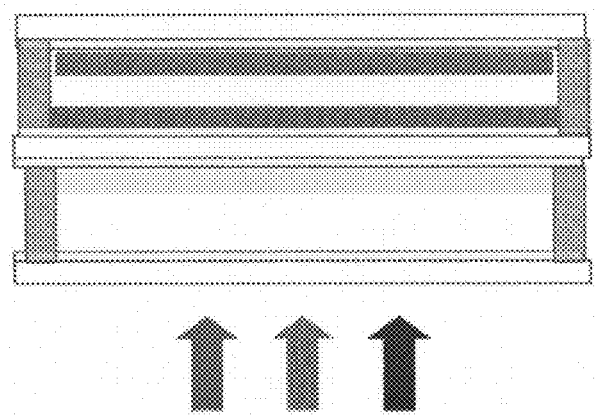
FIG. 11 is a schematic cross-sectional diagram of an exemplary embodiment of a transmissive color pixel structure.

Another exemplary color pixel structure may be a combined structure that can be employed in both reflective and transmissive modes. FIG. 10 shows the combined transmissive/reflective (transflective) structure. A reflective panel 1010 is provided so as to be insertable and removable. The reflective panel 1010 is preferably positioned outside the color pixel. The color pixel structure can be used in a transmissive mode by removing the reflective panel 1010. FIG. 11 is a schematic cross-sectional diagram illustrating the use of the color pixel structure in a transmissive mode. Examples of suitable materials for the reflective panel include, but are not limited to, high-brightness paper, cloth coated with a white material, and plastic coated with a white material.

Except for the structural characteristics, electrodes and electrochromic devices can be made by suitable known methods.

According to an exemplary embodiment, the electrochromic material layers 130 and 140 can be formed using at least one electrochromic material selected from the group consisting of metal oxides, such as tungsten oxide and molybdenum oxide, pyridine compounds, aminoquinone compound, and viologens.

The electrochromic material layers are formed using the electrochromic materials contained in nanostructures. Various semiconductor nanostructures may be used. Non-limiting examples of suitable semiconductor nanostructures include $TiO_2$, $ZnO_2$ and $CuO$. The nanostructures may have various shapes, including spheres, tetrahedrons, cylinders, rods, triangles, discs, tripods, tetrapods, cubes, boxes, stars, tubes, etc.

Non-limiting examples of the transparent substrates 111 and 121 include transparent inorganic substrates, such as glass and quartz substrates; and transparent plastic substrates, such as polyethylene terephthalate (PET), polyethylene naphthalate (PEN), polyethylene sulfone (PES), polycarbonate, polystyrene and polypropylene substrates. Flexible substrates are preferred.

Any transparent conductive material may be used to form the conductive layers 112 and 122 on the respective transparent substrates 111 and 121, and specific examples thereof include, but are not limited to, indium tin oxide (ITO), fluorine-doped tin oxide (FTO), transparent electrode materials composed of carbon nanotubes (CNTs), and conductive polymers, e.g., polyacetylene and polythiophene.

Any known material may be used as the electrolyte 150, and specific examples thereof include, but are not limited to, solutions of lithium salts, potassium salts and sodium salts in suitable solvents.

While the present invention has been shown and described with reference to some exemplary embodiments thereof, it should be understood by those of ordinary skill in the art that various changes in form and detail may be made therein without departing from the spirit and scope of the present invention as defined by the appending claims.

The invention claimed is:

1. A color pixel structure of an electrochromic display, the color pixel structure comprising:
 two one-cell two-color type unit cells, each comprising:
  an upper panel;
  a lower panel; and
  electrochromic materials of different colors disposed below the upper panel and above the lower panel; and
 a reflective panel,
 wherein the two one-cell two-color type unit cells are vertically laminated with one another,
 four colors of the two one-cell two-color type unit cells are different from one another, and
 the reflective panel receives light passing through the two one-cell two-color type unit cells and reflects the light.

2. A color pixel structure of an electrochromic display, the color pixel structure comprising:
 two one-cell two-color type unit cells, each comprising:
  n upper panel;
  lower panel; and
 electrochromic materials of different colors disposed below the upper panel and above the lower panel;
 a pair of partition walls disposed vertically between the upper panel and the lower panel on opposite ends of the upper panel and the lower panel; and
 a reflective panel,
 wherein the two one-cell two-color type unit cells are arranged parallel to each other,
 the electrochromic materials are disposed in a space defined by the upper panel, the lower panel, and the pair of partition walls,
 four colors of the two one-cell two-color type unit cells are different from one another, and
 the reflective panel receives light passing through the two one-cell two-color type unit cells and reflects the light.

3. The color pixel structure of claim 1, wherein the electrochromic materials have a same electrochemical properties, including discoloration upon oxidation or reduction.

4. The color pixel structure of claim 2, wherein the electrochromic materials have a same electrochemical properties, including discoloration upon oxidation or reduction.

5. The color pixel structure of claim 1, wherein one of the four colors of the two one-cell two-color type unit cells is black.

6. The color pixel structure of claim 2, wherein one of the four colors of the two one-cell two-color type unit cells is black.

7. A color pixel structure of an electrochromic display, the color pixel structure comprising:
  one one-cell two-color type unit cell having a first upper panel, a first lower panel, and electrochromic materials of different colors disposed below the first upper panel and above the first lower panel, and
  one one-cell one-color type unit cell having a second upper panel, a second lower panel, and an electrochromic material having a first color disposed at least one of below the second upper panel and above the second lower panel;
  wherein the one one-cell two-color type unit cell is vertically laminated with the one one-cell one-color type unit cell.

8. The color pixel structure of claim 2, further comprising a detachable reflective panel under the second lower panel.

9. The color pixel structure of claim 1, wherein the structure is transmissive.

10. The color pixel structure of claim 2, wherein the structure is transmissive.

11. A color pixel structure of an electrochromic display, the color pixel structure comprising:
  two one-cell one-color type unit cells, each comprising:
    an upper panel;
    a lower panel; and
    an electrochromic material disposed at least one of below the upper panel and above the lower panel; and
  a common unit cell comprising:
    a common upper panel;
    a common lower panel;
    a common electrochromic material disposed at least one of below the common upper panel and above the common lower panel,
  wherein the two one-cell one-color unit cells are arranged parallel to each other,
  the common unit cell is vertically laminated with the two one-cell one-color type unit cells, and
  external light passes through the common unit cell before being incident on the two one-cell one-color type unit cells.

12. The color pixel structure of claim 11, further comprising one-cell one-color type unit cells laminated on the respective unit cells arranged in parallel.

13. The color pixel structure of claim 12, wherein a color of one of the four unit cells is black.

14. The color pixel structure of claim 11, further comprising a detachable reflective panel disposed below the lower panel.

15. The color pixel structure of claim 12, further comprising a detachable reflective panel disposed below the lower panel.

16. The color pixel structure of claim 11, wherein the structure is transmissive.

17. The color pixel structure of claim 12, wherein the structure is transmissive.

* * * * *